United States Patent [19]

Iijima

[11] 4,082,826
[45] Apr. 4, 1978

[54] PROCESS FOR PRODUCING HIGHLY ION-CONDUCTIVE PORCELAIN

[75] Inventor: Sigeru Iijima, Nagoya, Japan

[73] Assignee: NGK Spark Plug Co., Ltd., Nagoya, Japan

[21] Appl. No.: 798,719

[22] Filed: May 19, 1977

[30] Foreign Application Priority Data

May 19, 1976 Japan .................................. 51-57598

[51] Int. Cl.$^2$ .............................................. C04B 35/10
[52] U.S. Cl. ........................................ 264/65; 106/45; 106/62; 106/65; 106/73.4; 252/521; 264/66; 423/600; 423/625; 429/193
[58] Field of Search .................... 106/73.4, 65, 62, 45; 429/193; 264/65, 66; 423/600, 625

[56] References Cited

U.S. PATENT DOCUMENTS

| | | | |
|---|---|---|---|
| 3,895,963 | 7/1975 | McGowan et al. | 106/73.4 |
| 4,013,477 | 3/1977 | Jatkar et al. | 106/73.4 |

OTHER PUBLICATIONS

Ray, A. K. et al., "Synthesis of Sodium B-and B Alumina", Nat. Res. Bull., 10(6), pp. 583–590, June 1975.
Devries, R. C. et al. "Critical Evaluation of the Literature Data on Beta–Alumina and Related Phases–I, Phase Equilibria and Characterization of Beta Alumina Phases", J. Am. Cer. Soc., 52(7), pp. 364–369.
"Research on Electrodes and Electrolyte for the Ford Sodium Sulfur Battery", Ford Motor Co. Research Report of July, 1974 to Nat'l. Science Foundation (NSF Contract–C805), pp. 14–18.

*Primary Examiner*—Helen M. McCarthy
*Attorney, Agent, or Firm*—Sughrue, Rothwell, Mion, Zinn and Macpeak

[57] ABSTRACT

A process for producing a highly ion-conductive porcelain having superior stability, which comprises (a) mixing about 87 to about 95% by weight of $Al_2O_3$ with about 5 to about 13% by weight, as $Na_2O$, of a sodium salt; (b) heat-treating the mixture at a temperature of not more than about 1500° C in an oxidizing atmosphere to produce a powder whose X-ray powder diffraction pattern has a $\beta$-$Al_2O_3$/$\beta''$-$Al_2O_3$ ratio such that the ratio of $I\beta:I\beta''$ is about 1.0:1 to about 0.25:1 where $I\beta$ is the peak intensity of $\beta$-$Al_2O_3$ in the (017) planes with $d=2.69$ A and $I\beta''$ is the peak intensity of $\beta''$-$Al_2O_3$ in the (01,11) planes with $d=2.60$A in which $d$ is the lattice distance; (c) mixing 100 parts by weight of the resulting powder obtained in (b) with not more than about 3 parts by weight, as the corresponding oxide, of at least one compound capable of providing a monovalent or divalent metal ion; (d) molding the mixture obtained in (c); and (e) sintering the molding in an alkaline atmosphere.

10 Claims, No Drawings

PROCESS FOR PRODUCING HIGHLY ION-CONDUCTIVE PORCELAIN

BACKGROUND OF THE INVENTION

1. Field of the Invention

This invention relates to a process for producing a porcelain consisting of a solid electrolyte, specifically a β-alumina porcelain, which has high sodium ion conductivity and good stability.

2. Description of the Prior Art

A β-alumina porcelain which is regarded as a commercially prospective sodium ion conductor is a double oxide expressed by the chemical formula $Na_2O.xAl_2O_3$. It includes two types, $\beta$-$Al_2O_3$ (where $x=9$-$11$), and $\beta''$-$Al_2O_3$ (where $x=5$-$7$).

For the purpose of the present description, both $\beta$-$Al_2O_3$ and $\beta''$-$Al_2O_3$ will be referred to herein generically as β-alumina, whereas the designation $\beta$-$Al_2O_3$ will be only used to denote specifically $Na_2O.xAl_2O_3$ wherein $x$ is 9 to 11.

$\beta''$-$Al_2O_3$ has a high sodium ion concentration and an ion conductivity several times higher than that of $\beta$-$Al_2O_3$, but the stability of $\beta''$-$Al_2O_3$ is poor. When $\beta''$-$Al_2O_3$ is heated to a temperature of more than 1550° C, it is transformed into $\beta$-$Al_2O_3$. At room temperature, (about 20°–30° C), too, $\beta''$-$Al_2O_3$ reacts with $CO_2$ or moisture in the air, and as a result the ion conductivity of $\beta''$-$Al_2O_3$ decreases. In extreme cases, $\beta''$-$Al_2O_3$ tends to disintegrate. Thus, in spite of many suggestions for commercialization, no practical applications for $\beta''$-$Al_2O_3$ have been found. In contrast, $\beta$-$Al_2O_3$ has good stability, but the insufficient ion-conductivity of $\beta$-$Al_2O_3$ has prevented practical application thereof.

SUMMARY OF THE INVENTION

An object of this invention to provide a process for producing a β-alumina porcelain having high ion conductivity and stability, in which the ion conductivity is substantially equal to that of $\beta''$-$Al_2O_3$ and the stability is substantially equal to that of $\beta$-$Al_2O_3$.

The present invention provides a process for producing a highly ion-conductive porcelain which comprises (a) mixing about 87 to about 95% by weight of $Al_2O_3$ with about 5 to about 13% by weight, as $Na_2O$, of a sodium salt; (b) heat-treating the mixture at a temperature of not more than about 1500° C in an oxidizing atmosphere to produce a powder whose X-ray powder diffraction pattern has a $\beta$-$Al_2O_3/\beta''$-$Al_2O_3$ ratio such that the ratio of $I\beta:I\beta''$ is about 1.0:1 to about 0.25:1 where $I\beta$ is the peak intensity of $\beta$-$Al_2O_3$ in the (017) (Miller indices) planes with $d=2.69$A and $I\beta''$ is the peak intensity of $\beta''$-$Al_2O_3$ in the (01,11) planes with $d=2.60$A in which $d$ is the lattice distance (lattice spacing); (c) mixing 100 parts by weight of the resulting powder obtained in (c) with not more than about 3 parts by weight, as the corresponding oxide, of at least one compound capable of providing a monovalent or divalent metal ion; (d) molding the mixture obtained in (d), and (e) sintering the molding in an alkaline atmosphere.

DETAILED DESCRIPTION OF THE INVENTION

The $Al_2O_3$ used in the present invention as a starting material in step (a) is employed in the form of a powder and the activity and sinterability of the $Al_2O_3$ powder in a synthetic reaction increases with decreasing particle size. However, if the particle size is too small, the $Al_2O_3$ powder is difficult to handle and mold, and the shrinkage of the $Al_2O_3$ upon sintering becomes too great. Generally, a suitable particle size of the $Al_2O_3$ powder ranges from about 0.3 to about 5 microns, preferably about 0.3 to about 2 microns. Any appropriate technique, e.g., ball milling, can be used to achieve the above-described particle sizes.

The sodium salt used in step (a) in the process of this invention has a low decomposition point and a low melting point, and reacts in the form of a liquid or a gas with the $Al_2O_3$. Hence, the particle size of the sodium salt can be chosen from a wide range of particle sizes. Generally, an average particle size of the sodium salt is conveniently not more than about 50 microns in order that the sodium salt can be mixed with the $Al_2O_3$ powder. A suitable particle size can range from about 5 microns to about 50 microns for the sodium salt.

The sodium salt used is a compound which is converted to $Na_2O$ by decomposition at a temperature of higher than about 700° C. Since β-alumina is synthesized at a temperature of higher than about 900° C, if $Na_2O$ is formed at a temperature lower than about 700° C, $Na_2O$ is evaporated before any β-alumina is produced. $Na_2CO_3$ is most preferred commercially as the sodium salt used in the invention form the standpoint of cost, stability and ease of handling. NaF, $NaHCO_3$, etc. can also be used.

In order to obtain sintered moldings having an initial specific resistivity at 300° C of not more than 10 ohm-cm, the mixing proportions of the $Al_2O_3$ and sodium salt in step (a) are such that the amount of $Al_2O_3$ is about 87 to about 95% by weight, and the amount of the sodium salt is about 13 to about 5% by weight, calculated as $Na_2O$. If the amount of $Na_2O$ is less than about 5% by weight, insufficient phase conversion to $\beta$-$Al_2O_3$ and $\beta''$-$Al_2O_3$ in the subsequent heat-treating step (b) occurs, and $\alpha$-$Al_2O_3$ remains unreacted. This tends to cause cracking and deformation to occur in molded products or moldings produced therefrom (hereinafter "moldings"), and the sintering of the moldings produced therefrom becomes difficult. Moreover, the $I\beta:I\beta''$ ratio rapidly increases to more than 10:1 as the amount of $Na_2O$ decreases beyond this limit. On the other hand, if the amount of $Na_2O$ exceeds about 13% by weight, the $I\beta:I\beta''$ ratio after the subsequent heat-treating step exceeds about 1.0:1. In addition, a heterogeneous phase of the $NaAlO_2$ type occurs to cause cracking in the resulting molding, and the sinterability of the resulting molding is deteriorated. A preferred amount of $Al_2O_3$ is 90 to 94% by weight, and a preferred amount of the sodium salt, as $Na_2O$, is 10 to 6% by weight. If the mixing proportions are within this range, effects of uneven mixing of $Al_2O_3$ and $Na_2O$, changes in the synthesizing conditions, etc. on the $I\beta:I\beta''$ ratio are small, and it is easy to adjust the $I\beta:I\beta''$ ratio to about 1.0:1 to about 0.25:1. This range is therefore suitable for commercial operations.

The $Al_2O_3$ and the sodium salt can be mixed using a dry or wet process. In the case of a dry process, the particle size of the $Al_2O_3$ and that of the sodium salt is preferably adjusted to about 1 mm to about 0.1 mm in order to reduce the amount of uneven mixing.

Using a wet process, a liquid organic compound in which the sodium salt is either not soluble or only very slightly soluble and which quickly volatilizes at room temperature is usually employed as a solvent. If the sodium salt is soluble to a high degree in the organic solvent mixing of the $Al_2O_3$ and the sodium salt becomes non-uniform at the time of drying. If the organic solvent has a low volatility, it is necessary to heat the mixture or use vacuum for drying to remove such. Examples of suitable organic solvents which can be used are acetone, ethyl alcohol, and diethyl ether. Usually, the organic solvent is used in an amount of about 0.7 to about 1.5 liters per kg of the solid starting materials. If the amount is less than about 0.7 liter per kg, the flowability of the slurry becomes poor, and mixing is difficult to perform rapidly. On the other hand, the volatilization of the solvent is time-consuming with amounts of solvent larger than about 1.5 liters per kg.

A suitable oxidizing atmosphere is any atmosphere containing oxygen. Generally, air is used as an oxidizing atmosphere.

The heat-treating temperture in step (b) is not higher than about 1500° C but not less than about 900° C. If the temperature is lower than about 900° C, scarcely any production of β-alumina occurs. A preferred heat-treating temperature in step (b) is about 1100° to about 1400° C. Within the temperature range of about 1100° to about 1400° C, the reaction to produce β-alumina proceeds sufficiently. This temperature range is especially preferred since the powder mass thus obtained does not become too solid, nor is a heterogenous phase such as that of $NaAlO_2$ formed.

The time required for heat-treatment in step (b) will vary depending on the total amount of the starting materials heat-treated, the proportion of the sodium salt present and the size of the reactor, employed. Such can be easily determined experimentally, e.g., by examining a sample, which has been removed therefrom, by X-ray diffraction analysis.

By limiting the heat-treating temperature in step (b) to not more than about 1500° C, the mixture of $Al_2O_3$ and the sodium salt reacts to an incompletely crystallized state, and the reactivity of the mixture increases. Thus, a substitution reaction of a monovalent and/or divalent metal ion for an aluminum ion easily occurs during the subsequent sintering in step (e) of the heat-treated mixture in an alkaline atmosphere, whereby a compact sintered molding is produced without the formation of a heterogeneous phase. If the heat-treated temperature in step (b) exceeds about 1500° C the Iβ in the Iβ:Iβ" ratio becomes excessively large (namely, the proportion of β-$Al_2O_3$ increases), and the initial specific resistivity of the sintered molding increases.

The Iβ:Iβ" ratio which is a measure of the ratio of β-$Al_2O_3$:β"-$Al_2O_3$ in the produced is determined by the $Al_2O_3$/$Na_2O$ mixing ratio and the heat-treating temperature. The Iβ:Iβ" ratio is about 1.0:1 to about 0.25:1. If such is larger than about 1.0:1, the specific resistivity of the sintered molding increases. In order to reduce the specific resistivity, the excess of β-$Al_2O_3$ must be transformed into β"-$Al_2O_3$ by sintering under an alkaline atmosphere. Additionally, the substitution reaction between the monovalent or divalent metal ion and the aluminum ion is time-consuming, and the substitution cannot be performed sufficiently. The monovalent or divalent metal ion precipitates in the grain boundary between the β-$Al_2O_3$ crystals and the β"-$Al_2O_3$ crystals to form a heterogeneous phase which in turn reduces the sodium ion conductivity of the product. The ion conductivity of the product is also degraded because of the increased proportion of β-$Al_2O_3$ crystals in the sintered β-alumina. On the other hand, if the Iβ:Iβ" ratio is less than about 0.25:1, namely if the proportion of β"-$Al_2O_3$ is excessively high, the molded mixture absorbs moisture and deforms, and in extreme cases, is likely to disintegrate during a short period of time between formation of a molding of the β-alumina in step (d) and the sintering thereof in step (e).

A preferred Iβ:Iβ" ratio is 0.9:1 to 0.4:1. When the Iβ:Iβ" ratio is within this range, the effect of adding the compound capable of providing a monovalent or divalent metal ion is especially marked. Furthermore, since within this range of 0.9:1 to 0.4:1, the hygroscopicity of the resulting powder is very low, the mixture does not disintegrate and is particularly easy to handle.

The heat-treating time in step (b) required to bring the ratio of β-$Al_2O_3$:β"-$Al_2O_3$ to values within the above-specified range is generally about 10 minutes to about 7 hours. If the time is less than about 10 minutes, the production of β-alumina may be incomplete. On the other hand, if the time exceeds about 7 hours, the amount of $Na_2O$ which dissipates increases as the time increases, and the β-alumina formed is again transformed into α-$Al_2O_3$. It is difficult therefore to control the $Na_2O$ content. Even if control of the $Na_2O$ content can be achieved, the β-alumina crystals become coarse and their sinterability is impaired. Suitable times and temperatures can be easily determined experimentally.

The metal ion of a compound capable of providing a monovalent or divalent metal ion, which is to be mixed with the resulting powder, increases the ion conductivity of the sintered β-alumina together with the Na ion in the alkaline atmosphere used in sintering the β-alumina. Effects are achieved with such a metal ion in amounts as small as about 0.2 part by weight, as the corresponding oxide, per 100 parts by weight of the resulting powder. If the amount exceeds about 3 parts by weight, β-alumina is sintered before the substitution and phase transition described above have been performed completely. This results in the formation of a heterogeneous phase, and the sodium ion conductivity of the β-alumina is impaired. Furthermore, the specific resistivity of the β-alumina changes greatly with the lapse of time. Since a heterogeneous phase is formed in the β-alumina with an increase in the amount of the metal compound, the hygroscopicity of the sintered β-alumina molding abruptly increases, and its stability in the atmosphere is reduced.

A preferred amount of the metal ion-providing compound is 0.8 to 2.2 parts by weight, as the corresponding oxide, per 100 parts by weight of the resulting product. Within this range, the effect of adding the metal ion-providing compound is especially marked, and the resulting porcelains have especially low hygroscopicity. Thus, porcelains having superior stability can be obtained. $Li^+$, $Mg^{++}$ and $Zn^{++}$ are suitable examples of a monovalent or divalent metal ion. A substitution reaction of the monovalent or divalent metal ion for trivalent aluminum ion, occurs due to the presence of the mono- or divalent metal ion during the sintering in step (e) with consequently electrical neutrality is maintained. Hence, as a result the β-alumina absorbs the number of Na ions corresponding to the difference in valence between the substituted metal ion and the aluminum ion from the alkaline atmosphere and an increase in ion concentration occurs and the substitution reaction thus contributes to the high ion conductivity of the crystals. It has been additionally found that the monovalent or divalent metal ion is not limited to the above examples, and other transition metal elements which can form stable oxides of divalent metals, such as those of $Ni^{++}$ or $Mn^{++}$, exhibit similar effects. In other words, compounds capable of providing a metal ion that can replace an aluminum ion can be used. Examples of suitable compounds capable of providing a metal ion that can be used in the invention are MgO, ZnO, NiO and MnO and those compounds which decompose at as low a temperature as possible below about 1300° C and are converted to oxides and gases, for example, carbonate salts such as $LiCO_3$, $ZnCO_3$ or $MgCO_3$, and halide (e.g., F, Cl, I and Br) compounds such as LiCl or MgF. Generally, compounds which are stable by themselves are used. The porcelains of this invention can be obtained by using two or more compounds capable of providing a metal ion in the same way as in the case of using only one such compound.

The particle size of the metal ion-providing compound is not particularly critical since after addition to the $\beta$-alumina powder, the mixture is pulverized. In order to avoid non-uniformity in mixing with $\beta$-alumina, the metal compound suitably has a particle diameter of about 500 to about 0.3 micron.

After mixing the metal compound with the $\beta$-alumina powder the mixture is pulverized to produce a powdery mixture generally having an average particle diameter of about 0.5 to about 2 microns. An organic binder is then added to the resulting powdery mixture. Suitable binders are temporary binders generally used at the time of molding in the ceramic industry which bind the powder particles to one another to provide strength to the molding and volatilize or decompose and volatilize off at the time of sintering. Specific examples of suitable binders are synthetic resins such as acrylic resins, vinyl chloride resins, vinyl acetate resins, and epoxy resins, and natural organic materials such as rubber, rosin, starch, cellulose or camphor. The amount of the binder which is used in step (d) is preferably as small as possible since it must be volatilized or decomposed and volatilized off at the time of sintering. Suitable amounts can be selected depending on the type of starting material ($\beta$-alumina) or binder, the strength required at the time of molding, etc. Usually, a suitable amount of the binder is about 0.1 to about 10% by weight based on the weight of the starting materials used in step (d) to be molded.

The binder can be mixed with the powdery mixture using a dry process or a wet process. In the case of a wet process, the mixing can be performed in the same way as in the mixing of the $Al_2O_3$ with a sodium salt. Usually, a solvent for the binder is used as an organic medium. Examples of suitable organic media which can be used are the same as those given hereinabove.

The starting powdery mixture so produced is molded, and then sintered in step (e) in an atmosphere rendered alkaline using $Na_2O$ (hereinafter, $Na_2O$ alkaline atmosphere) and in e.g., in a refractory crucible. The sintering can be performed by any conventional method.

$Na_2O$ begins to evaporate from the $\beta$-alumina at about 1200° C. Unless an atmosphere having a higher vapor pressure than that of the $Na_2O$ is formed around the $\beta$-alumina during the sintering in step (e), $Na_2O$ dissipates from the $\beta$-alumina, and finally $\alpha$-$Al_2O_3$ is formed. Suitable alkaline atmospheres are atmospheres in which the $Na_2O$ partial pressure is higher than the vapor pressure of the $Na_2O$ in the $\beta$-alumina at that temperature. This atmosphere can be produced by adding an excess of alkali to $\beta$-alumina prior to sintering thereby to obtain the required $Na_2O$ partial pressure using the $Na_2O$ vapor evolved from the $\beta$-alumina itself, by placing a sodium salt outside the $\beta$-alumina thereby to obtain the required $Na_2O$ partial pressure due to the decomposition of the sodium salt, or by sealing the $\beta$-alumina using platinum or the like to prevent a dissipation of the $Na_2O$ and thereby to maintain the $Na_2O$ partial pressure.

The sintering in step (e) can be performed in a similar manner to conventional sintering methods although it differs according to the method of producing the alkaline atmosphere and the method of sintering. According to the process of this invention, however, the sintering in step (e) can be performed at a temperature about 50° to about 100°C lower than the temperature required in conventional methods, and this is of great commercial significance. Usually, the sintering in this invention is carried out at a temperature of about 1500° to about 1750° C for about 5 to about 90 minutes, especially at 1560° to 1650° C for about 20 to about 60 minutes.

Suitable crucibles which can be used in the production of $\beta$-alumina are those generally used.

Crucibles having a high $SiO_2$ content are consumed to a high extent by $Na_2O$. For this reason, refractories composed mainly of $\alpha$-$Al_2O_3$ are used as materials for crucibles used in this invention. Although the $\alpha$-$Al_2O_3$ of the refractory is partly converted to $\beta$-alumina due to the effect of the $Na_2O$, there is scarcely any effect of the $\alpha$-$Al_2O_3$ of the refractory on the powder mass synthesized. Since the effect is only due to the $Na_2O$, if a layer of $\alpha$-$Al_2O_3$ or $\beta$-alumina is formed on the surface of the crucible, the body of the crucible may be of any material which is resistant to temperatures of at least about 1500° C.

The sintering of the molded body in the final step, step (e), is performed in accordance with conventional techniques in a refractory crucible in an alkaline atmosphere. Since the heat-treating temperature for the starting materials, $Al_2O_3$ and $Na_2O$, is not higher than about 1500° C to keep the mixture in the incompletely crystallized state, the sintering of the molding in step (e) is promoted. Thus, porcelains of a sufficiently compact texture can be obtained at a sintering temperature of not more than about 1650° C which is lower than the sintering temperature (about 1700° C) in the production of conventional $\beta$-alumina porcelains whose specific resistivity at 300° C is as high as about 30 ohm-cm. Since the sintering of the molding can be performed within shorter periods of time, the alkaline atmosphere is easy to control, and distortion and cracking of even moldings of complicated shapes tend not to occur.

The process of the present invention makes it possible to produce quantities of highly ion conductive porcelains which have a low specific resistivity substantially equal to that of $\beta''$-$Al_2O_3$ and good stability in the air nearly equal to that of $\beta$-$Al_2O_3$, and produce superior commercial advantages.

The following Examples are given to illustrate the present invention more specifically. Unless otherwise indicated herein, all parts, percents, ratios and the like are by weight.

EXAMPLE 1

Commercially available alumina having a low sodium content i.e., less than 0.5% by weight and having an average particle diameter of less than 1 $\mu$ (maximum particle diameter 3 $\mu$) and $Na_2CO_3$ (purity more than 99.5%) were wet-mixed for 2 hours in the various proportions shown in Table 1 below (in the case of $Na_2CO_3$, the amount was calculated as $Na_2O$) using 1 liter of acetone as an organic medium per kg of the starting powder. In order to uniformly evaporate the acetone, the mixture was dried at room temperature with stirring. The powdery mixture was placed in a refractory crucible and heat-treated at each of the temperatures mixture including the binder was 1 kg in each lot, and 10 sintered moldings were prepared from each lot. The characteristic values obtained were an average of those of the 10 sample moldings thus produced.

Table 1

| Sample No. | Starting Materials | | Heat-Treatment | | $I\beta/I\beta''$ of the Powdery Mass | Amount of $Li_2O$ added to Powdery Mass (parts by weight) | Sintering Temp. for the Molding (°C) | Sintered Molding | | |
|---|---|---|---|---|---|---|---|---|---|---|
| | $Al_2O_3$ (wt %) | $Na_2O$ (wt %) | Temp. (°C) | Time (hours) | | | | $I\beta/I\beta''$ | Initial (ohm-cm) | Specific-Resistivity at 300° C Change after 40 hrs. (%) |
| 1 | *86 | *14 | 1250 | 1 | 1.25 | 0–3.0 | Sintering of the molding difficult | | | |
| 2 | 87 | 13 | 1400 | " | 0.80 | 0.8 | 1580 | 0.53 | 9.1 | +4.6 |
| 3 | 89 | 11 | 1250 | 1 | 0.98 | 0.8 | 1610 | 0.70 | 7.8 | +3.2 |
| 4 | 91.5 | 8.5 | 1250 | " | 0.76 | 0.8 | 1610 | 0.35 | 6.0 | +1.5 |
| 4a | " | " | 1350 | 1 | 0.51 | 0.8 | 1620 | 0.28 | 5.7 | +2.3 |
| 4b | " | " | 1400 | " | 0.73 | 0.8 | 1620 | 0.51 | 7.1 | +2.5 |
| 4c | " | " | 1500 | 1 | 0.91 | 0.8 | 1630 | 0.71 | 9.0 | +4.1 |
| 4d | " | " | *1550 | " | 1.09 | 0.8 | 1650 | 1.33 | 16.4 | +5.3 |
| 5 | 94 | 6 | 1350 | 3 | 0.60 | 1.7 | 1630 | 0.30 | 6.5 | +2.9 |
| 6 | 95 | 5 | 1350 | " | 0.95 | 1.6 | 1640 | 0.80 | 9.4 | +3.5 |
| 7 | *97 | *3 | 1250 | 1 | 10 | 3.0 | Sintering of the molding difficult | | | |

(1) $Li_2O$ was added as $LiCO_3$. The amount of $Li_2O$ was based on 100 parts by weight of the powdery mass (the same applies to other Examples given herein).
(2) The asterisks indicate values outside the scope of the invention.
(3) The specific resistivity of the sintered molding was measured as follows: The sintered molding was immersed in molten metallic sodium, and molten metallic sodium was also poured into the central hole of the bottom of the sintered molding to provide electrodes at the inside and outside surfaces of the sintered molding. The initial resistivity of the sintered molding was measured in an argon atmosphere using the direct current four probe method. Then, the polarity of the measuring current was changed every 10 seconds using a timer, and the resistivity of the sintered molding was measured each time. The change of the resistivity after 40 hours to the initial resistivity was calculated.

and for each of the periods of time indicated in Table 1 to form a synthetic powdery mass of $\beta$-$Al_2O_3$ and $\beta''$-$Al_2O_3$. $Li_2CO_3$ (purity more than 98.0%) was added in the various amounts indicated in Table 1 to the powdery mass, and the mixture was dry-pulverized to form a synthetic powdery mixture of $\beta$-$Al_2O_3$ and $\beta''$-$Al_2O_3$ having an average particle size of 1.0 to 1.5 microns. To the resulting synthetic powdery mixture were added 5% by weight based on the weight of the powdery mixture of camphor as an organic binder and 1 liter, per kg of the starting powders, of acetone, and they were wet-mixed. The mixture was dried at room temperature to form a starting powder.

The resulting starting powder was formed into a tubular body having a bottom with an outside diameter of 22 mm, a thickness of 3.5 mm and a length of 190 mm using a rubber press (isotatic press) of 1500 kg/cm². The tubular body was machined, and filled in a magnesia crucible. In an alkaline atmosphere, the temperature was increased at a rate of 300° C/hour, and the tubular body was maintained at each of the maximum temperatures indicated in Table 1 for 30 minutes to form a highly ion-conductive porcelain composed mainly of $\beta''$-$Al_2O_3$ in the form of a test tube having an outside diameter of 15 mm, a thickness of 1 mm and a length of 150 mm. The alkaline atmosphere was produced by uniformly mixing commercially available $\beta$-alumina powder with 1.0 to 2.0% by weight of $Na_2CO_3$ based on the weight of the alumina powder, placing the mixture in a refractory crucible, embedding the molding $\beta$-alumina in it, and then sintering the molding.

Table 1 shows the $Al_2O_3/Na_2O$ ratio in the starting materials, the heat-treating temperature and time, the $I\beta:I\beta''$ ratio of the synthetic powdery mass, the amount of $Li_2CO_3$ calculated as $Li_2O$ which was added to the synthetic powdery mass, and the firing temperature for the molding, and the characteristic values of the sintered molding. The amount of the starting powdery It can be seen from the results in Table 1 that Samples Nos. 2 to 4c, 5 and 6 prepared from a starting material mixture of 87 to 95% by weight of $Al_2O_3$ and 13 to 5% by weight of $Na_2O$ at a heat-treating temperature of not more than 1500° C had a $I\beta:I\beta''$ ratio of 1.0:1 to 0.25:1 in the powdery mass. Sintered moldings obtained from a mixture of 100 parts by weight of the powdery mass with not more than 3.0 parts by weight of $Li_2CO_3$, calculated as $Li_2O$, all had an initial specific resistivity of less than 10 ohm-cm at 300° C with small changes with lapse of time. In contrast, Sample No. 1 which contained $Na_2O$ in an amount larger than the specified range had a $I\beta:I\beta''$ ratio of more than 1.0:1 and a molding of the synthetic powder with not more than 3 parts by weight of $Li_2O$ developed cracks at the time of sintering, and could not be sintered. Sample No. 7 which contained a smaller amount of $Na_2O$ and a larger amount of $Al_2O_3$ had a $I\beta:I\beta''$ ratio of as high as 10:1. When 3 parts by weight, the upper limit specified in the invention, of $LiO_2$ was added to the synthetic powder, and the molding was sintered in an alkaline atmosphere of an especially high concentration of $Na_2O$, it was difficult to control the atmosphere, and large deviations in the characteristics of the sintered moldings occurred. Furthermore, because of the smaller amount of $Na_2O$, the sintered moldings developed cracks and deformations which were probably due to the expansion that occurred at the time of transition of the unreacted $\alpha$-$Al_2O_3$ remaining in large quantities in the moldings to $\beta$-alumina. Thus, the sintered moldings were not commercially feasible. On the other hand, Sample No. 4d in which the $Al_2O_3/Na_2O$ ratio was within the specified range but the heat-treating temperature was 1550° C which is beyond the upper limit specified in the present invention had a $I\beta:I\beta''$ ratio of 1.09:1, and the sintered moldings had high initial specific resistivities with large changes with lapse of time, and could not be used for practical application.

EXAMPLE 2

$Li_2O$ was added in varying proportions to the starting powdery mixture used to prepare Sample No. 4a having a $I\beta:I\beta''$ ratio of 0.51:1, which showed the best result in Table 1, and the same procedures as in Example 1 were repeated. Furthermore, the same procedures were repeated using other compounds capable of providing a metal ion or without using such a compound. The results obtained are shown in Table 2 below.

same manner as in the product of Samples Nos. 12 to 17 containing 0.2 to 3.3 parts by weight of $Li_2O$ were allowed to stand for long periods of time in a constant temperature/constant humidity area, and their moisture resistances were measured. The results obtained are shown in Table 3 below.

Table 3

| | Starting Materials | | | | Amount of $Li_2O$ added to Powdery Mass (parts by weight) | Sintering Temp. for the Molding (°C) | Moisture Resistance | | | |
|---|---|---|---|---|---|---|---|---|---|---|
| | Starting Materials | | Heat Treating Temp. (°C) | $I\beta/I\beta''$ of the Powdery Mass | | | Initial Specific Resistivity at 300° C (ohm-cm) | After Standing for 30 days at 25° C and 50%RH | | Time Elapsed until Cracking Occurred at 65° C and 90%RH (hours) |
| Sample No. | $Al_2O_3$ (wt %) | $Na_2O$ (wt %) | | | | | | Specific resistivity at 300° C (ohm-cm) | Appearance | |
| 11' | 91.5 | 8.5 | 1350 (1 Hr) | 0.51 | *0 | 1620 | 20.5 (20.3) | 20.4 | No change | 92 |
| 12' | " | " | " | " | 0.2 | " | 9.7 (9.7) | 9.6 | " | 88 |
| 13' | 91.5 | 8.5 | 1350 (1 Hr) | 0.51 | 0.8 | 1620 | 5.8 (5.7) | 5.7 | " | 87 |
| 14' | " | " | " | " | 1.6 | " | 5.4 (5.3) | 5.5 | No change | 89 |
| 15' | 91.5 | 8.5 | 1350 (1 Hr) | 0.51 | 2.2 | 1620 | 4.5 (4.6) | 4.7 | " | 88 |
| 16' | " | " | " | " | 3.0 | " | 3.7 (3.7) | 4.1 | Moisture absorbed slightly at the surface | 50 |
| 17' | 91.5 | 8.5 | 1350 (1 Hr) | 0.51 | *3.3 | 1620 | 4.0 (3.9) | Measurement impossible | Many small cracks occurred | 20 |

(1) The asterisks indicate values outside the scope of the present invention.
(2) In the initial specific resistivity column, the figures in the parentheses are those reproduced from Table 2 (in order to show that the reproducibility of the effect in accordance with the present invention is good).

It can be seen from the results in Table 3 that of Samples Nos. 12' to 16' in accordance with this invention, Samples Nos. 12' to 15' showed much the same degrees of changes with the lapse of time of the specific resistivity as Sample No. 11 which is regarded as a $\beta$-$Al_2O_3$ porcelain. Sample No. 16' in which the amount Table 2

| | Starting Materials | | | | Metal Ion-Providing Compound added to Powdery Mass (parts by weight) | | Sintering Temp. for the Molding (°C) | | Sintered Molding | |
|---|---|---|---|---|---|---|---|---|---|---|
| | Starting Materials | | Heat-Treating Temp. (°C) | $I\beta/I\beta''$ of the Powdery Mass | | | | | Specific Resistivity at 300° C | |
| Sample No. | $Al_2O_3$ (wt %) | $Na_2O$ (wt %) | | | | | | $I\beta/I\beta''$ | Initial (ohm-cm) | Change after 40 hrs. (%) |
| 11 | 91.5 | 8.5 | 1350 (1 Hr) | 0.51 | * | 0 | 1620 | | 20.3 | +0.8 |
| 12 | " | " | " | " | $Li_2O$ | 0.2 | " | 0.85 | 9.7 | +1.1 |
| 13 | 91.5 | 8.5 | 1350 (1 Hr) | 0.51 | " | 0.8 | 1620 | 0.28 | 5.7 | +2.3 |
| 14 | " | " | " | " | " | 1.6 | " | 0.25 | 5.3 | −0.3 |
| 15 | 91.5 | 8.5 | 1350 (1 Hr) | 0.51 | $Li_2O$ | 2.2 | 1620 | 0.22 | 4.6 | +1.7 |
| 16 | " | " | " | " | " | 3.0 | " | 0.16 | 3.7 | +9.3 |
| 17 | 91.5 | 8.5 | 1350 (1 Hr) | 0.51 | *" | 3.3 | 1620 | 0.17 | 3.9 | +2.53 |
| 13a | " | " | " | " | MgO | 0.8 | " | 0.79 | 8.6 | +1.6 |
| 13b | 91.5 | 8.5 | 1350 (1 Hr) | 0.51 | ZnO | 0.8 | 1620 | 0.81 | 9.3 | −0.7 |
| 13c | " | " | " | " | $Li_2O$ MgO | 0.4 0.4 | " | 0.54 | 6.8 | +1.2 |

(1) $Li_2O$, MgO and ZnO were all added as the carbonates thereof.
(2) The data for Sample No. 13 are those obtained for Sample No. 4a as shown in Table 1 and are reproduced in Table 2 for comparative purposes.
(3) The asterisks indicate values outside the scope of the invention.

Sample No. 11 which was regarded as a sintered molding of $\beta$-$Al_2O_3$ with a $I\beta:I\beta''$ ratio of $\infty$ as shown in Table 2, and Samples Nos. 11' to 17' produced in the of $Li_2O$ added was 3.0 parts by weight, the upper limit specified in the present invention, showed a somewhat lower moisture resistance in the high temperature/high humidity (65° C, 90% RH) accelerated test. The moisture resistance of Sample No. 16′, however, was much superior to that of Sample No. 17′ in which 3.3 parts by weight, larger than the upper limit specified in the invention, of Li$_2$O was added. When maintained for 30 days in an atmosphere at 25° C and a relative humidity of 50% which approximates that of atmospheric air, Sample No. 16′ only showed a slight tendency to absorb moisture, and was practical.

As can be seen from the results in Tables 2 and 3, the compound capable of providing a metal ion shows a marked effect in the reduction of specific resistivity when used in small amounts. This can be understood from a comparison of the results for Sample No. 12 with those for Sample No. 11 and the results for Sample No. 12′ with those for Sample No. 11′. However, as can be seen from a comparison of the results for Sample No. 16 with those for Sample No. 17 and the results for Sample No. 16 with those for Sample No. 17′, the upper limit of the amount of the metal-ion providing compound is 3.0 parts by weight, and if the amount exceeds this limit, changes in specific resistivity with the lapse of time abruptly increase, and the moisture resistance of the samples is reduced abruptly.

It was confirmed that MgCO$_3$ and ZnCO$_3$ can be used in the same manner as Li$_2$CO$_3$.

The results shown in Tables 1 to 3 demonstrate that the porcelains produced by the process of this invention all had low initial specific resistivities, little changes in specific resistivity with the lapse of time, and good stability in atmospheric air was obtained. These superior properties meet the requirements of highly ion-conductive porcelains which are used in the purification of metallic sodium, the electrolysis of molten salts in the soda industry, Na-S type electric cells, etc.

While the invention has been described in detail and with reference to specific embodiments thereof, it will be apparent to one skilled in the art that various changes and modifications can be made therein without departing from the spirit and scope thereof.

What is claimed is:

1. A process for producing a highly ion-conductive procelain with a low specific resistivity not more than 10 ohm-cm at 300° C and with good stability in air, which comprises
   (a) mixing about 87 to about 95% by weight of Al$_2$O$_3$ of a particle size of about 0.3 to about 5 microns with about 5 to about 13% by weight, as Na$_2$O, of a sodium salt of a particle size of about 5 to about 50 microns, wherein the sodium salt is a compound which decomposes to Na$_2$O at a temperature higher than about 700° C;
   (b) heat-treating the mixture obtained in (a) at a temperature of about 900° to about 1500° C in an oxidizing atmosphere for a time of from about 10 minutes to about 7 hours to produce a powder which in the X-ray powder diffraction pattern has a $\beta$-Al$_2$O$_3$/$\beta''$-Al$_2$O$_3$ ratio such that the ratio of I$\beta$:I$\beta''$ is about 1.0 to about 0.25:1 where I$\beta$ is the peak intensity of $\beta$-Al$_2$O$_3$ in the (017) planes with $d=2.69$ A and I$\beta''$ is the peak intensity of $\beta''$-Al$_2$O$_3$ in the (01,11) planes with $d=2.60$ A in which $d$ is the lattice distance;
   (c) mixing 100 parts by weight of the resulting heat-treated powder obtained in (b) with 0.2 to about 3 parts by weight, as the oxide, of at least one compound capable of providing a monovalent or divalent metal ion, said ion increasing the ion conductivity of the sintered $\beta$-alumina in step (e) in combination with the Na ion in the alkaline atmosphere used in step (e);
   (d) molding the mixture obtained in (c); and
   (e) sintering the molding in Na$_2$O alkaline atmosphere at a temperature of about 1500° to about 1750° C for about 5 to about 90 minutes.

2. The process of claim 1, wherein the sodium salt is Na$_2$CO$_3$.

3. The process of claim 1, wherein the compound capable of providing a metal ion is a compound which is converted to the corresponding metal oxide and a gas at a temperature of not more than about 1300° C.

4. The process of claim 1, wherein the compound capable of providing a metal ion is MgO, ZnO, NiO or MnO.

5. The process of claim 3, wherein the compound capable of providing a metal ion is Li$_2$CO$_3$, MgCO$_3$ or ZnCO$_3$.

6. The process of claim 1, wherein the heat-treating temperature in (b) is about 1100° to about 1400° C.

7. The process of claim 1, wherein the I$\beta$:I$\beta''$ ratio is 0.9 to 0.4:1.

8. The process of claim 1, wherein the amount of the compound capable of providing a metal ion, calculated as the corresponding oxide, is 0.8 to 2.2 parts per 100 parts by weight of the heat-treated powder obtained in (b).

9. The process of claim 1, wherein the sintering in (e) is at a temperature of 1560° to 1650° C.

10. The process of claim 9, wherein said sintering is conducted for from about 20 to about 60 minutes.

* * * * *